July 10, 1956

P. E. EDELMAN 2,754,150

AUTOMATIC IRRIGATOR

Filed March 10, 1952

INVENTOR

Philip E. Edelman

July 10, 1956

P. E. EDELMAN 2,754,150

AUTOMATIC IRRIGATOR

Filed March 10, 1952

INVENTOR

Philip E. Edelman

United States Patent Office 2,754,150
Patented July 10, 1956

2,754,150

AUTOMATIC IRRIGATOR

Philip E. Edelman, Los Angeles, Calif.

Application March 10, 1952, Serial No. 275,805

6 Claims. (Cl. 299—25)

The invention relates to improvements in automatic irrigators wherein co-acting elements are combined to provide automatic moistening of the topsoil of land utilized for gardening, landscape lawns, farming and the like, responsive to the particular moisture content of the topsoil and the requirements of the vegetation grown. The invention also provides an irrigator that functions within restrictions imposed upon the use of water from a water supply in locations where the available amount of water is limited and must not be wasted at certain times or thru excessive moistening.

The objects of the invention are to provide new and useful means to moisten the topsoil of land in the correct pre-detemined amount, dependent on the moisture in the topsoil. Other objects are to provide automatic irrigation means so that the need for manual working of the system is minimized or eliminated. The topsoil used for a lawn, for example, may be correctly watered during the absence of the land occupant or his hired gardener at appropriate times and only in a required amount.

In order to apply the invention in different locations that have widely varying conditions of the soil and ambient temperature changes that affect the dispersion of water in the soil and the rate of surface evaporation therefrom, a further object is to provide a compensating electrode device that retains a small portion of the delivered water so that it can evaporate without dependency upon the rate of drainage thru the topsoil. It has been found that whenever the natural air spaces in the earth are only partially saturated with moisture, a temperature differential can cause a migration of the moisture toward a region of the lowest temperature. Stability may be reached when a state of equilibrium occurs between the natural forces of gravity, surface tension and evaporation, while the rate of dispersion is also dependent upon the particular composition of the topsoil. When there is a water saturation at a cold surface on the soil, water tends to be drained away from this region at an accelerated rate. As will presently appear, this natural circumstance has previously been a detriment to attempts to apply automatically controlled irrigation to widely different topsoils, which is an object of the present invention.

The invention is illustrated in the accompanying drawings.

Figure 1:
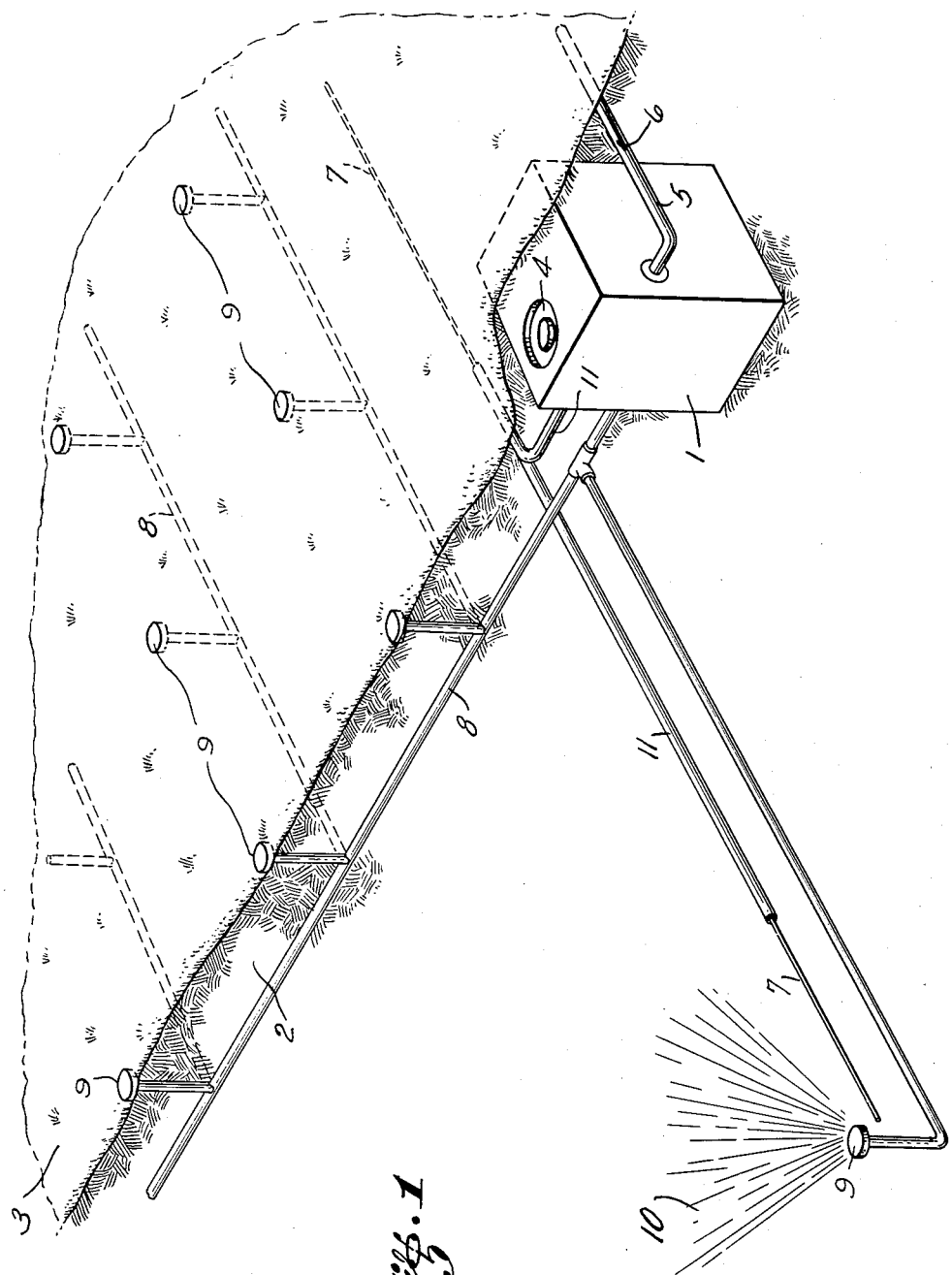
Figure 1 is a diagram showing its application, the usage of this example being for automatic lawn watering.
Figure 2:
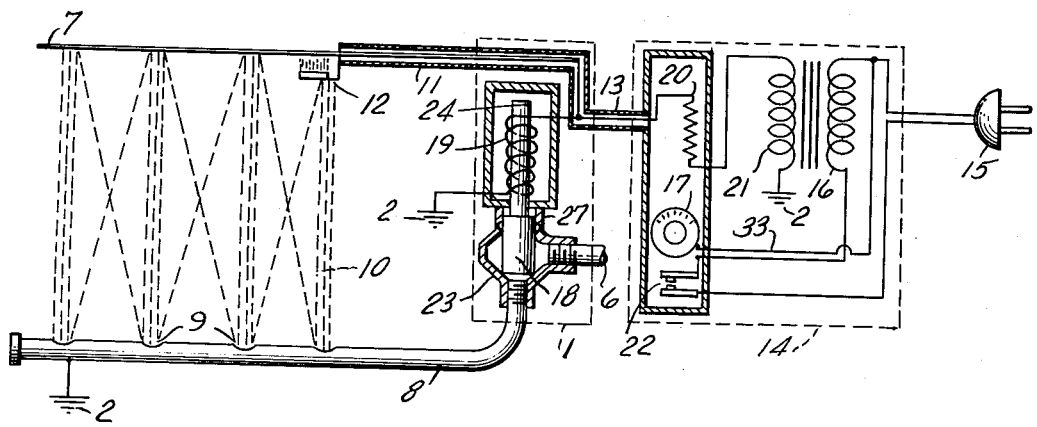
Figure 2 is a schematic diagram of the new combination, suitable for the usage shown in Figure 1.
Figure 3:
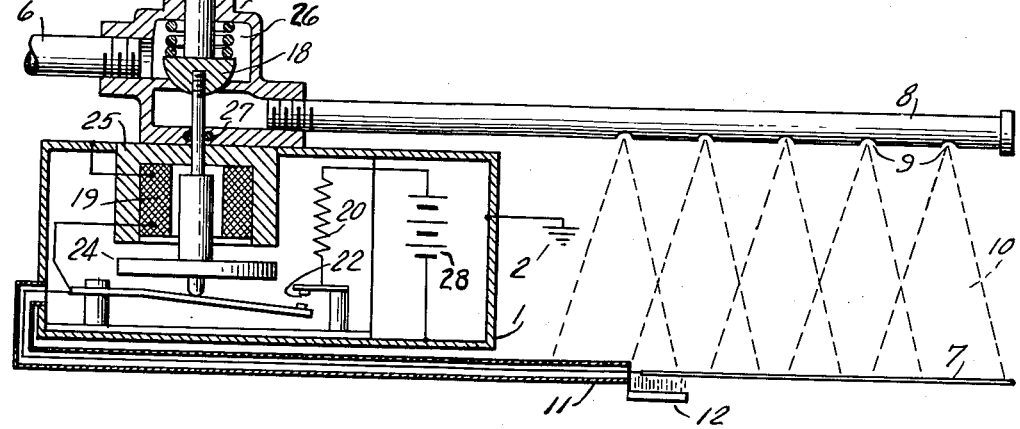

Figure 3 is a schematic diagram of a modified form of the invention shown in Figure 2, and requiring no external connection to a source of electrical power. Similar reference numerals refer to similar elements. Other modifications may be made within the scope of the invention, as set forth in the appended claims.

A water-tight box or housing 1 is adapted to be placed in the topsoil 2 of the land to be watered. An access means 4 is provided in the housing 1 to permit manual adjustment for the elements therein. The vegetation 3 is preferably above the level of container 1. A water pipe 5 connects to the housing 1 and has a suitable source of water 6. A sheathed insulated connecting line 11 extends from the housing 1 and terminates in its electrode end 7, disposed in the topsoil 2. A valve-controlled pipeline 8 extends from the housing 1, and is provided with a suitable array of watering spray heads 9. Spray heads 9 are preferably disposed just below the level of vegetation 3 so that the water-spray 10 can move outward therefrom. Electrode 7, of suitable metal or wire, is disposed in the topsoil 2 so as to be exposed to water from the spray 10, which moistens the topsoil 2. It is found that the moisture absorbed in the topsoil 2 conducts electricity supplied from the housing 1 so that the resistance between element 7 and the grounded pipeline 8 is sensed as a measure of the prevailing moisture content of the topsoil 2. This conductivity between the elements 7 and 8 actuates means in the housing 1 to control or stop the flow of water in pipeline 8. If, for example, the topsoil is already moist enough, the means provided in combination with container 1 stops further flow of water thru the pipeline 8.

The completely automatic watering means combined in the housing 1 and its auxiliary power supply is exemplified in Figure 2. Box 1 houses a solenoid actuated valve 23, and may also house the power box 14. Power box 14 can also be located remotely, as shown in Figure 2, so that a low voltage power cable 13 connects the output of box 14 to solenoid 19 of the valve 23.

Power box 14 receives a suitable source of operating electricity by means of the connector plug 15 which is adapted to connect to a commonly available alternating current source of power. Container 14 encloses a transformer 16, 21, also an adjustable resistor 20, series-connected to secondary winding 21. Normally open contactors 22, controlled by the time-switch 17, are in series with the transformer primary winding 16. The time-switch 17 is of well known type and may be set to determine the time of day or night at which contacts 22 close as well as the maximum interval of time that they can remain closed. A synchronous clock type of time-switch 17 can thus be set to pre-determine when the watering can occur. Resistor 20 may be adjusted to determine the rate of watering. It is preferably of the type well known and characterized by an increase of resistance with an increase in the current supplied therethru.

Solenoid winding 19 is series connected to the transformer winding 21 via the connecting line 13 and resistor 20, with return circuit via ground 2. A shunt control circuit is provided around the solenoid winding 19. This control circuit comprises the insulated connecting line 11 and its terminated electrode 7, which is series connected via the moisture in ground 2 from the spray 10 to the grounded pipeline 8. Normally, whenever there is sufficient moisture absorbed in topsoil 2, the resistance between the elements 7 and 8 is low enough to divert electricity from transformer winding 21 via the adjusted resistor 20 and around the solenoid winding 19, as a shunt circuit, so that the solenoid winding 19 is not then sufficiently energized to open the valve 23. The poppet 18 of the valve 23 cannot remain open in this circumstance, even though the contactors 22 of the time-switch 17 are closed. When, however, the moisture in the topsoil 2 is deficient, this resistance between the elements 7 and 8, as predetermined by the adjusted resistor 20, affords only a high resistance shunt circuit around solenoid winding 19, so that it is able to pull up its plunger 24 and open the poppet 18 of the valve 23. In the latter circumstance, the valve 23 will open when the contacts 22 are closed, but only until sufficient moisture is absorbed in the topsoil 2, ambient to the elements 7 and 8, to lower the resistance therebetween and cause the plunger 24 to drop and close the valve 23. This can occur even when the pre-set timing for the contactors 22 happens to be for a longer interval than is necessary. A suitable packing seal 27 is provided between the valve 23 and its solenoid winding 19. Since some topsoils are more permeable and drain off faster than others, a small localized auxiliary electrode path 12 is provided adjacent to the electrode 7 and the sheath 11. Electrode path 12 is disposed to retain a portion of the moisture, in sufficient quantity to prevent false release of the plunger 24. This auxiliary electrode path 12 normally dries up during the interval between successive waterings. It also functions to prevent unnecessary watering via the valve 23 when natural rainfall is commencing. In certain locations where topsoil 2 is a poor conductor, even when moist, the auxiliary electrode path 12 may be augmented with crystals of a slowly dissociating electrolyte salt. Both a localized and a distributed shunt conducting path are thus afforded between the sensing element 7 and the grounded pipeline 8 and sheath 11. The stated elements thus combine and coact for the purposes set forth, so that an owner of the apparatus can rely on this automatic irrigator, even in his absence, as long as the water input 6 and the electric input at 15 is available. No unnecessary water will be used or wasted. The irrigating can also be accomplished automatically at predetermined times when a scarce water supply system is not normally subjected to peak demand usage. This enables a user of the invention to comply with local restrictions on the flow of water from public systems during daytime hours. The amount of water used is accordingly strictly conserved to the pre-determined requirement. The invention also provides a "fail safe" feature, desirable in any automatic apparatus, namely, that if the power supply input to the connector 15 fails, the valve 23 will close and stay closed, pending restoration of electric service to plug 15. Except during a time of irrigating, the only electricity consumed is that required for the operation of the synchronous motor which is shunted around the open contactors 22, directly to the plug 15, whether contacts 22 are open or closed. The circuit via the wire 33 is not dependent on the contactors 22, so the motor of the time-switch 17 runs continuously.

The time switch 17 is essentially a program switch which limits the time of day or night in which the power unit may be used. In localities where there are no restrictions on the use of water from a public supply, this time switch 17 may be omitted.

In order that the invention may be used in localities where public utility electric power supply is unavailable for application, the modification of Figure 3 for operation on a local battery 28 is suitable. Ordinary dry batteries of commerce are suitable because power is consumed in a small amount only while the irrigator is in operation.

The ball poppet 18 of the valve 23 may be manually opened by pulling up on the lift member 4 against the restoring spring 23. Packings 27 seal against leakage. When the operating member 4 is pulled up, the holding armature 24 engages the core member 25 and is held there by the winding 19. At the same time, contacts 22 are closed to energize the electromagnet 19 via a series resistor 20, from the battery 28. Electrode 7 is also connected to one end of the winding 19 in such a manner that the circuit formed via the element 7 thru the moist topsoil 2, soaked by the spray 10, extends via the grounded water line 8, as a parallel shunt circuit around the coil 19. Valve 23 thus remains open until the conductivity between the members 7 and 8, augmented by the localized conductivity at the auxiliary member 12, increases with increase of absorbed moisture from the spray 10 until the winding 19 is no longer able to hold the armature 24 against the restoring spring 26. The valve then shuts off, the switch 22 opens, and there is no extra drain on the battery 28. Resistor 20 may be of an adjustable variable type, as in Figure 2. The modification of Figure 2 requires no special wiring, since the power unit is complete and self-contained in the housing 1. Electrode member 7 may be disposed or distributed so as to be responsive to the particular moisture content of the topsoil 2.

The amount of power required for holding the armature 24 is very small in comparison to that which would be necessary to move the member 24 thru an air gap. The small current drain on battery 28 makes this modification useful and practical. An owner can start the irrigation and then need not be present to watch it, as the device of the invention will shut the water off as soon as enough water has permeated the topsoil 2. The unit of the modified form shown in Figure 3 is also of the "fail safe" type, as no water can flow via valve 23 if the battery 28 is exhausted. Battery 28 can be renewed at infrequent periods of time, as required.

The local water catching area 12 on the extended end of the sheath 11 may be augmented by means of dissociating crystals of known type in localities where the topsoil 2 is deficient in soluble mineral content.

The water dispensing outlets 9 may be of any suitable type. The solenoid winding 19 serves to operate the valve 23, responsive to the moisture sensing element 7. This water determining element 7 is an overriding control to regulate the valve 23. It will not permit valve 23 to remain open whenever there is already a sufficient predetermined amount of moisture absorbed in the topsoil 2. If the valve 23 is pulled open when additional watering is not required, the device operates to promptly close its poppet member 18. Even if the topsoil 2 is of a type which drains off absorbed moisture rapidly, the auxiliary element 12 will maintain the sensing element 7 operative until its locally retained small amount of water 10 evaporates. Sensing element 7 normally becomes operative via the water 10 absorbed between it and grounded pipeline 9, augmented by the small localized moist path between the member 7 and the element 12 at the end of the sheath 11. The invention is thus practicable for new installations as well as for modification of existing non-automatic systems.

I claim:

1. Automatic irrigation apparatus comprising a water line having spray dispensing outlets to moisten land topsoil, a control valve therefor, a source of electrical power and a solenoid to actuate the valve, a resistor to regulate the current passing thru the solenoid, and a shunt circuit in parallel around the solenoid and including both a portion of separately held water and a portion of the moistened topsoil served by said water line, whereby the moisture absorbed in said topsoil reduces the current flowing thru the solenoid until the valve shuts water flow off.

2. Automatic irrigation apparatus for watering land topsoil comprising, in co-acting combination, a connector adapted to receive a supply of alternating current power, a time switch and a transformer connected thereto, a resistor connected to regulate the output from the transformer, a solenoid winding energized thereby when the time switch is positioned to operate the transformer, a topsoil moisture-responsive circuit connected at a first current path in parallel around said solenoid winding to divide the current passed by said resistor in a proportion determined by the relative amount of moisture absorbed in said topsoil, a water valve actuated by the solenoid winding, a water supply line controlled by said valve, dispensing heads for said line, and means positioned to collect a small amount of water from one of the heads and forming a second current path around the solenoid winding.

3. Irrigation apparatus comprising a water line having dispensing heads and a control valve therefor, a moisture sensing means including an electrode placed to contact some of the dispensed water and an adjacent moisture holder combined therewith, a source of electrical power and a current limiter connected in series with said sensing means, and an electrical valve actuator shunted around said sensing means to share the amount of power passed by said limiter responsive to the amount of water held by said moisture holder.

4. Automatic irrigation apparatus for watering land comprising a source of water supply, a source of electrical power supply, a water line having dispensing outlets and a control valve connected to the water supply, an electrical actuator for the valve, a current limiter connecting the actuator to the power supply, a program time switch connected to control the availability of the power supply and an overriding circuit shunted around said actuator and including combined moisture sensing and water holding means adapted to consume power away from the limited amount available to said actuator when wet.

5. An automatic irrigator comprising a water line with dispensing outlets to moisten land topsoil, an electrode and a cooperating moisture holder disposed to be capable of contacting a portion of the dispensed water as a moisture sensing means, a valve connected to control flow via said outlets, an electrical actuator for the valve connected to shunt around said moisture sensing means, a source of electrical power having a current limiter connected in series to said actuator and said sensing means, a program time switch to control the availability of power thru said current limiter, and a power consuming circuit including said moisture sensing means when sufficiently wetted, whereby power available thru the current limiter from the program switched power supply becomes insufficient thru the electrical actuator to allow flow thru the valve.

6. An automatic irrigator comprising a water line having a control valve and dispensing outlets to moisten land topsoil, a combined electrode and moisture holder disposed to sense moisture dispersed in the topsoil and also a small portion of the water that is dispensed by an outlet and retained by said holder, an electrical actuator for the valve, a power supply for the actuator, a current limiter connected between the power supply and both the actuator and the electrode, and circuit connections including said moistened electrode, whereby power is consumed and diverted away from the electrical actuator in an amount that is responsive to the sensed moisture which is sufficient to prevent water flow thru the valve.

References Cited in the file of this patent

UNITED STATES PATENTS

| | | |
|---|---|---|
| 1,459,391 | Clausen | June 19, 1923 |
| 2,031,146 | Dodge | Feb. 18, 1936 |
| 2,577,337 | Lancaster | Dec. 4, 1951 |
| 2,578,981 | Parker | Dec. 18, 1951 |
| 2,599,862 | Ray | June 10, 1952 |
| 2,611,643 | Higgins | Sept. 23, 1952 |
| 2,695,976 | Hasenkamp | Nov. 30, 1954 |